(12) United States Patent
Zalzalah

(10) Patent No.: US 9,073,269 B2
(45) Date of Patent: Jul. 7, 2015

(54) TIRE SEALANT DELIVERY SYSTEM

(75) Inventor: James H. Zalzalah, Oregon (IL)

(73) Assignee: Plews, Inc., Dixon, IL (US)

( * ) Notice: Subject to any disclaimer, the term of this patent is extended or adjusted under 35 U.S.C. 154(b) by 1007 days.

(21) Appl. No.: 13/181,196

(22) Filed: Jul. 12, 2011

(65) Prior Publication Data

US 2013/0014858 A1 Jan. 17, 2013

(51) Int. Cl.
 *B29C 73/16* (2006.01)
 *B29L 30/00* (2006.01)

(52) U.S. Cl.
 CPC ........... *B29C 73/166* (2013.01); *B29L 2030/00* (2013.01)

(58) Field of Classification Search
 CPC . B29C 73/166; B65D 81/325; B65D 83/0011
 USPC ......... 141/38, 104–105, 27; 222/390; 81/15.6
 See application file for complete search history.

(56) References Cited

U.S. PATENT DOCUMENTS

| | | | |
|---|---|---|---|
| 591,477 A * | 10/1897 | Johnson | 81/15.6 |
| 1,746,604 A | 2/1930 | Piquerez | |
| 2,646,707 A | 7/1953 | Notz | |
| 2,689,675 A * | 9/1954 | Stirrup | 222/389 |
| 2,812,783 A | 11/1957 | Bufogle | |
| 3,729,033 A | 4/1973 | Bayerkohler | |
| 3,891,127 A * | 6/1975 | Fernandez et al. | 222/387 |
| 3,984,033 A * | 10/1976 | Groth et al. | 222/333 |
| 4,101,494 A | 7/1978 | Kent et al. | |
| 4,137,206 A | 1/1979 | Kent | |
| 4,224,208 A | 9/1980 | Kent | |
| 4,276,898 A | 7/1981 | Ross | |
| 4,308,766 A | 1/1982 | Myers, Jr. | |
| 4,337,322 A | 6/1982 | Jaspon | |
| 4,426,468 A | 1/1984 | Ornum et al. | |
| 4,501,825 A | 2/1985 | Magyar et al. | |
| 4,528,331 A | 7/1985 | Bohm et al. | |
| 4,713,114 A | 12/1987 | Smith | |

(Continued)

FOREIGN PATENT DOCUMENTS

| | | |
|---|---|---|
| DE | 19846451 | 4/2000 |
| DE | DM058926 | 1/2002 |

(Continued)

OTHER PUBLICATIONS

Fix-N-Fill informational sheet (WGH-3950), pp. 1, 2011.

(Continued)

*Primary Examiner* — Kevin P Shaver
*Assistant Examiner* — Timothy P Kelly
(74) *Attorney, Agent, or Firm* — Bay Area Technology Law Group PC

(57) ABSTRACT

A tire sealant delivery system comprising a container, a moveable piston disposed within the container, the moveable piston cooperatively engage able with the container such that the piston does not rotate during operation, a threaded shaft cooperatively engaged with the piston and the container, a tube for connecting the container to a receiver, a dispenser comprising, an electric actuator, the electric actuator connectable to the container for rotating the threaded shaft, an air compressor, and a valve connectable to the container and connected to the air compressor, the valve operable to selectively allow dispensing of a tire sealant from the container to a receiving tire, or dispensing of compressed air from the air compressor to a receiving tire.

7 Claims, 10 Drawing Sheets

(56) References Cited

U.S. PATENT DOCUMENTS

| | | |
|---|---|---|
| 4,765,367 A | 8/1988 | Scott |
| 4,798,233 A | 1/1989 | Mooney |
| 4,970,242 A | 11/1990 | Lehman |
| 5,070,917 A | 12/1991 | Ferris et al. |
| 5,124,395 A | 6/1992 | Abramowski et al. |
| 5,251,787 A | 10/1993 | Simson |
| 5,338,776 A | 8/1994 | Peelor et al. |
| 5,364,463 A | 11/1994 | Hull |
| 5,386,857 A | 2/1995 | Fogal, Sr. et al. |
| 5,403,417 A | 4/1995 | Dudley et al. |
| 5,472,023 A | 12/1995 | Fogal, Sr. et al. |
| 5,500,456 A | 3/1996 | Hughett et al. |
| 5,564,606 A | 10/1996 | Engel |
| 5,618,912 A | 4/1997 | Fang |
| 5,648,406 A | 7/1997 | Peelor et al. |
| 5,705,604 A | 1/1998 | Fang |
| 5,765,601 A | 6/1998 | Wells et al. |
| 5,819,983 A | 10/1998 | White et al. |
| 5,908,145 A | 6/1999 | Jaksa |
| 5,916,931 A | 6/1999 | Adams et al. |
| 5,977,196 A | 11/1999 | Wicks |
| 5,992,476 A | 11/1999 | Sowry |
| 6,013,697 A | 1/2000 | True et al. |
| 6,019,145 A | 2/2000 | Savidge |
| 6,092,569 A | 7/2000 | Simmel et al. |
| 6,176,285 B1 | 1/2001 | Gerresheim et al. |
| 6,283,172 B1 | 9/2001 | Thurner |
| 6,345,650 B1 | 2/2002 | Paasch et al. |
| 6,412,524 B1 | 7/2002 | Fogal, Sr. |
| 6,736,170 B2 | 5/2004 | Eriksen et al. |
| 6,766,834 B1 | 7/2004 | Eckhardt |
| 6,789,581 B2 | 9/2004 | Cowan et al. |
| 6,889,723 B2 | 5/2005 | Gerresheim et al. |
| 6,964,284 B2 | 11/2005 | Eckhardt |
| 6,968,869 B2 | 11/2005 | Eckhardt |
| 7,021,348 B2 | 4/2006 | Eriksen et al. |
| 7,028,720 B2 | 4/2006 | Eckhardt |
| 7,070,354 B1 | 7/2006 | Gutierrez-Caro |
| 7,789,110 B2 | 9/2010 | Marini |
| 7,891,385 B2 | 2/2011 | Yanagi et al. |
| 2002/0112777 A1 | 8/2002 | Fang et al. |
| 2003/0047652 A1 | 3/2003 | Eckhardt |
| 2003/0056851 A1 | 3/2003 | Eriksen et al. |
| 2007/0169326 A1 | 7/2007 | Smith |
| 2007/0267438 A1 | 11/2007 | Wijerama |
| 2009/0301602 A1 | 12/2009 | Lolli et al. |

FOREIGN PATENT DOCUMENTS

| | | |
|---|---|---|
| DE | 10106468 | 8/2002 |
| EP | 1961632 | 8/2008 |
| WO | 0021875 | 4/2000 |
| WO | 03004328 | 1/2003 |
| WO | 03041949 | 5/2003 |
| WO | 2004041649 | 5/2004 |

OTHER PUBLICATIONS

International Search Report and the Written Opinion, PCT/US2012/046367, datedd Sep. 21, 2012.

Supplementary European Search for EP 12 81 1936 dated Feb. 17, 2015.

* cited by examiner

TIRE SEALANT DELIVERY SYSTEM

FIELD OF THE INVENTION

The invention relates to a tire sealant delivery system, and more particularly, to a tire sealant delivery system for selectively dispensing sealant or compressed air to a receiving tire.

BACKGROUND OF THE INVENTION

Representative of the art is U.S. Pat. No. 5,908,145 which discloses a housing of length and cross-sectional dimension to enclose a given amount of tire sealing fluid is selected, coupled with a flexible hose at its output port with a pneumatic tire valve, and charged at its input port from a source of compressed air to inject the tire sealing fluid within the housing by means of the hose through the pneumatic valve to protect a tire against later blowouts or puncturing in use. In a preferred embodiment, the housing is constructed of a polyvinylchloride tube, while the hose is constructed of a clear vinyl composition.

What is needed is a tire sealant delivery system for selectively dispensing sealant or compressed air to a receiving tire. The present invention meets this need.

SUMMARY OF THE INVENTION

The primary aspect of the invention is a tire sealant delivery system for selectively dispensing sealant or compressed air to a receiving tire.

Other aspects of the invention will be pointed out or made obvious by the following description of the invention and the accompanying drawings.

The invention comprises a tire sealant delivery system comprising a container, a moveable piston disposed within the container, the moveable piston cooperatively engage able with the container such that the piston does not rotate during operation, a threaded shaft cooperatively engaged with the piston and the container, a tube for connecting the container to a receiver, a dispenser comprising, an electric actuator, the electric actuator connectable to the container for rotating the threaded shaft, an air compressor, and a valve connectable to the container and connected to the air compressor, the valve operable to selectively allow dispensing of a tire sealant from the container to a receiving tire, or dispensing of compressed air from the air compressor to a receiving tire.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
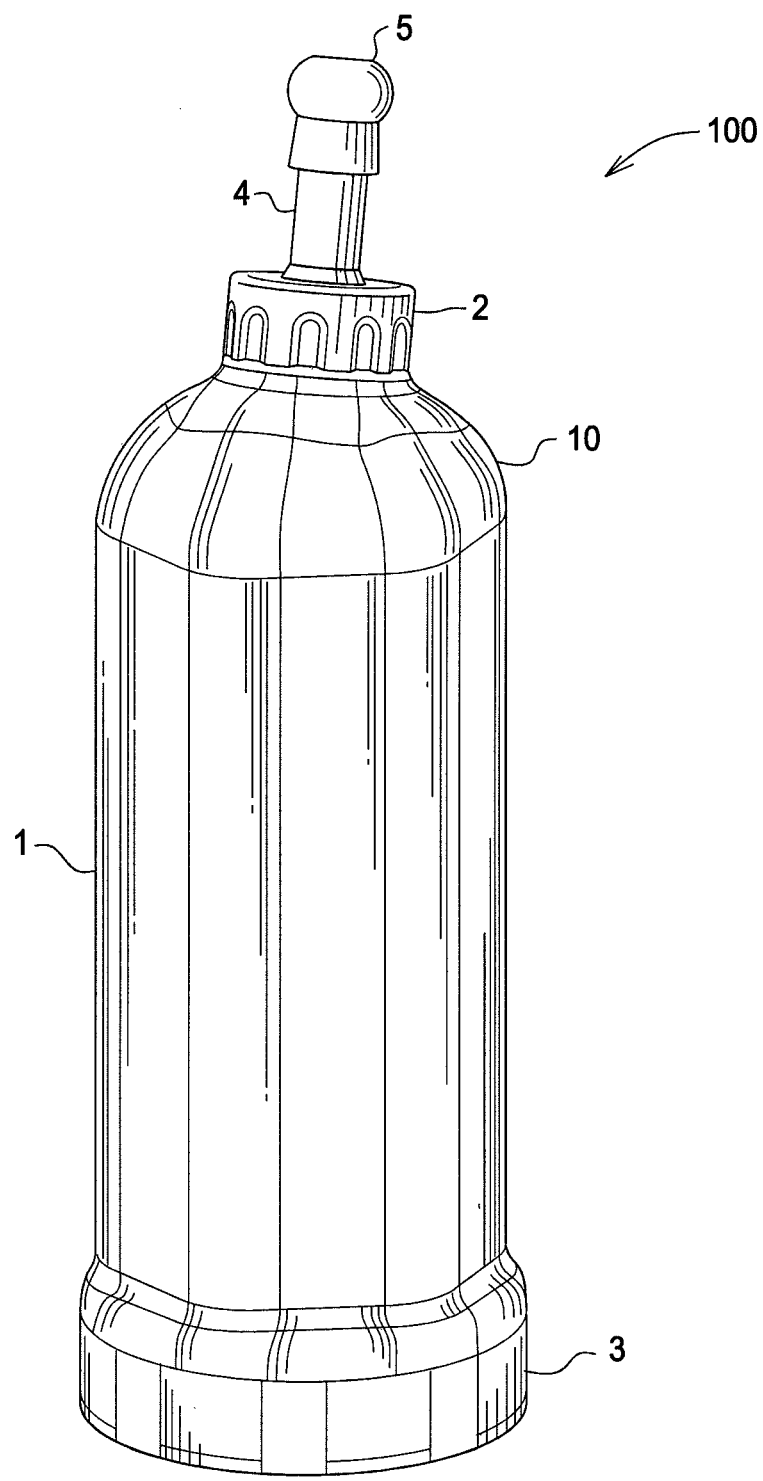
FIG. 1 is a perspective view of the container.

FIG. 1 is a perspective view of the container. Container 100 comprises a body 1, cap 2 and rotor 3. Cap 2 is disposed on an end that is opposite the rotor 3. Body 1 is generally cylindrical. An end 10 is hemispherical in form in order to accommodate the piston as more fully described herein. A typical sealant capacity of the body is 16 oz.

Figure 2:
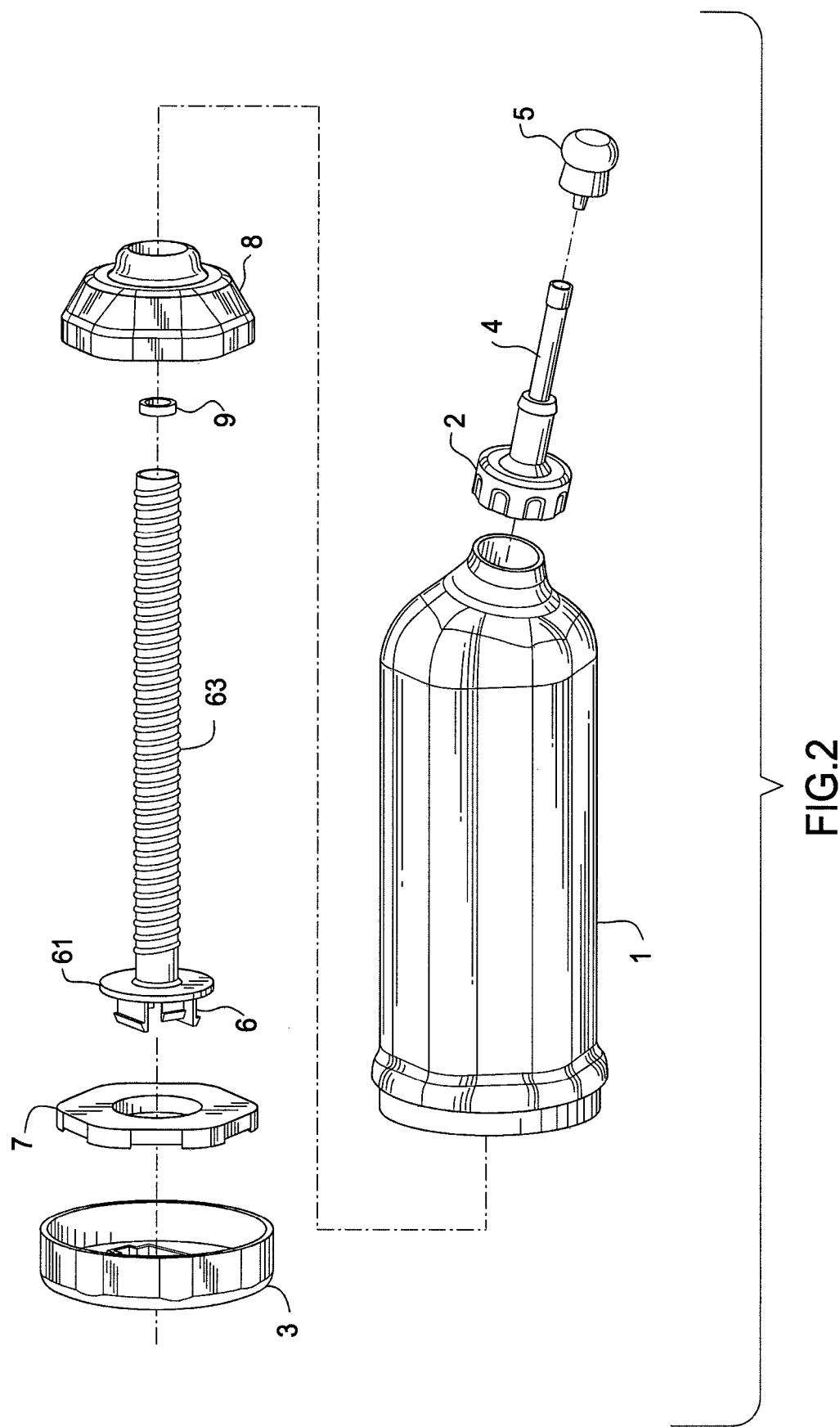
FIG. 2 is an exploded view of the container.

FIG. 2 is an exploded view of the container. Bearing 7 is fastened to the end of the body. Bearing 7 seals the body in which the sealant is contained. Threaded shaft 6 extends through bearing 7. A first end 61 connects to rotor 3. A second end 62 connects to the piston 8. Shaft cap 9 is disposed between threaded shaft 6 and piston 8.

A flexible tube 4 extends from cap 2. Threaded to the end of tube 4 is a valve core tool 5. Valve core tool 5 is known in the art and is placed at the end of the tube 4 for the convenience of a user.

The container is also refillable and reusable, thereby extending the utility of the system.

Figure 3:
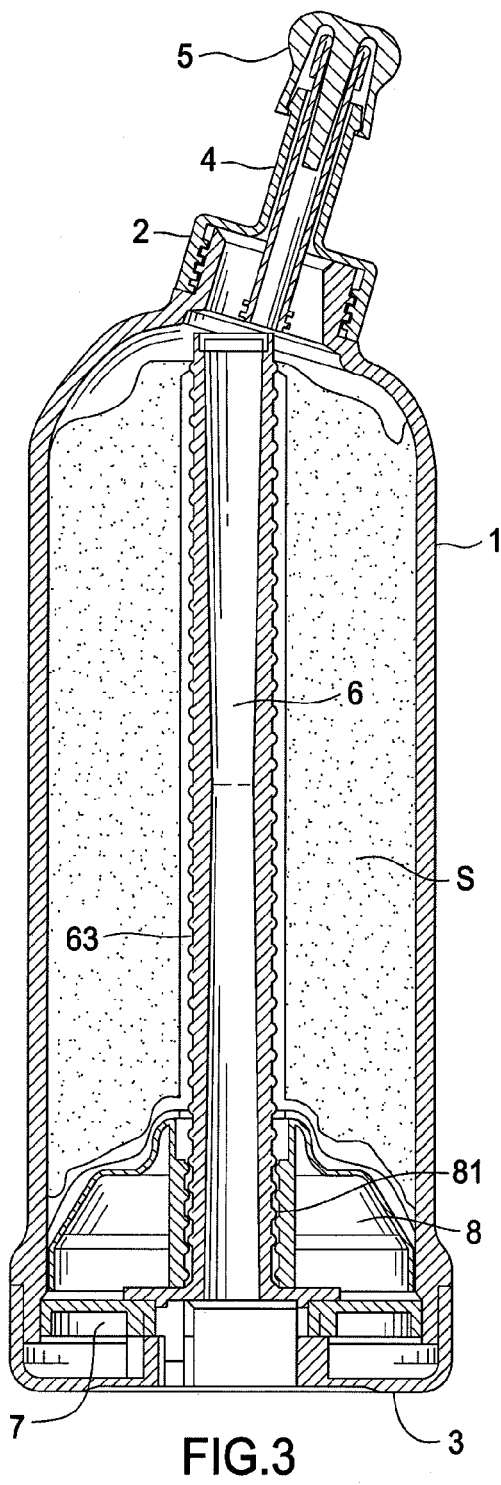
FIG. 3 is a cut-away view of the container.

FIG. 3 is a cut-away view of the container. Sealant (S) is shown within the body 1. Threaded shaft 6 extends substantially the entire length of body 1. The outer surface 63 of threaded shaft 6 is threaded. Outer surface thread ably engages an inner surface 81 of piston 8. Bearing 7 is fixed to the end of body 1. Threaded shaft 6 is engaged with bearing 7 such that as shaft 6 is rotated shaft 6 does not move axially with respect to bearing 7. Threaded shaft 6 is connected to rotor 3. A user grasps and rotates rotor 3 by hand. As the rotor 3 and threaded shaft 6 rotates piston 8 advances axially along the length of shaft 6 due to the threaded engagement with shaft 6 thereby compressing and expelling the sealant through tube 4. Piston 8 is prevented from rotating relative to the body 1 due to the hexagonal planiform of the piston, see FIG. 15. The hexagonal form cooperatively engages the body which has a cooperating cross-sectional form.

Exemplary operational parameters for the system are as follows. These parameters are offered as examples only and are not intended to limit the use or operation of the inventive device. In this table "bottle" refers to the container 1, "fluid" refers to the sealant (S), and "pusher" refers to the piston 8.

| | | |
|---|---|---|
| Sealant filling capacity | 16.47 | Oz |
| Un used volume | 0.47 | Oz |
| Total volume come out | 16 | Oz |
| No of rev | 15 | turns |
| Displacement of piston per rev | 1 | cm cube |
| Volume displacement per rev | 1.0667 | ounce |
| Viscosity | 7900 | centipoise |
| Density of fluid | 1.1 | gm/cm cube |
| Diameter of nozzle | 0.4 | cm cube |
| Rotation speed (assumed) | 4 | rpm |
| Outside pressure p2 | 0 | |
| Flow rate will be | 4.2667 | oz/min |
| I ounce = | 29.574 | cm cube |
| Flow rate will be | 126.18 | cm cube/min |
| Liquid velocity will be at nozzle | 16.735 | cm/sec |

-continued

| | |
|---|---|
| Liquid velocity inside bottle | 0.0605 |
| Cross section of bottle | 34.74 cm sqre |
| Pressure inside the bottle | 154.03 gm/cm sqre |
| Force on Pusher w | 5.3512 kg |
| Helix angle α | 12 deg |
| Helix angle α | 0.2094 rad |
| Friction angle φ | 11.5 deg |
| Friction angle φ | 0.2007 rad |
| Torque on shaft = w tan (α + φ) | 2.3267 kg cm |

Figure 4:
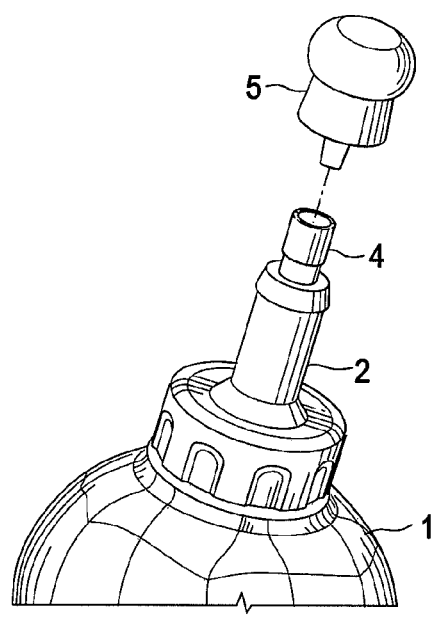
FIG. 4 is a detail of the valve core tool.

FIG. 4 is a detail of the valve core tool. Valve core tool 5 is removeable attached to the end of tube 4. Tube 4 is flexible in order to allow it to be connected to a pneumatic tire valve. Valve core tool 5 is a well known core tool widely available in the art for removal and installation of Spreader® brand pneumatic valve cores. Of course, the valve core tool may be selected to engage any other valve core such as a Presto™ valve as well.

Figure 5:
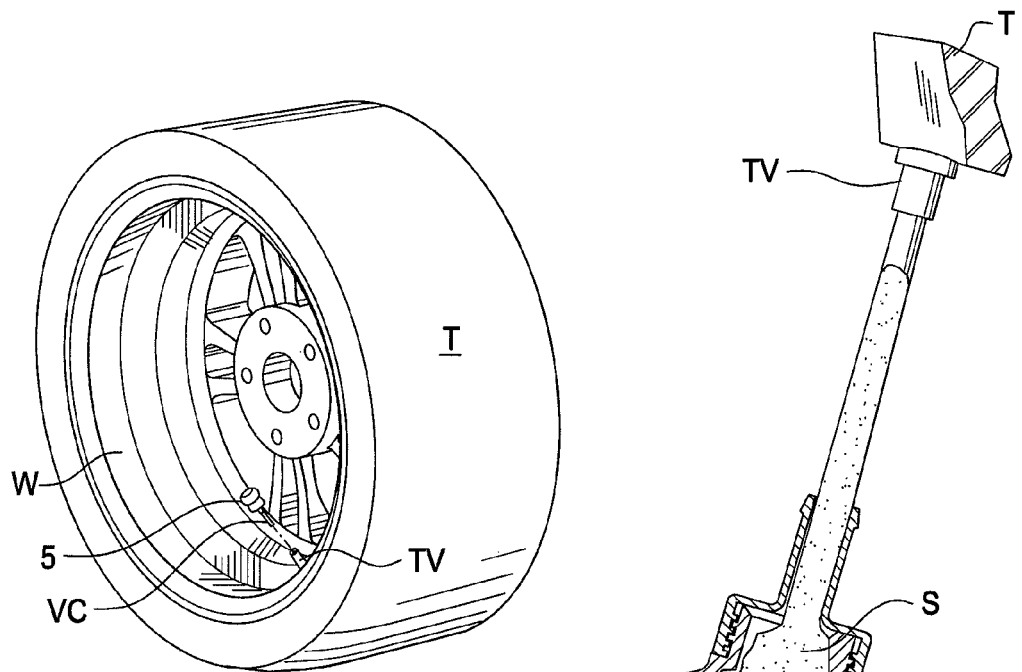
FIG. 5 is a perspective view of the valve core tool in use on a tire.

FIG. 5 is a perspective view of the valve core tool in use on a tire. Valve core tool 5 is shown with a valve core (VC) symbolically removed from a tire valve (TV). Tire (T) is mounted to a wheel (W) in a manner known in the art.

Figure 6:
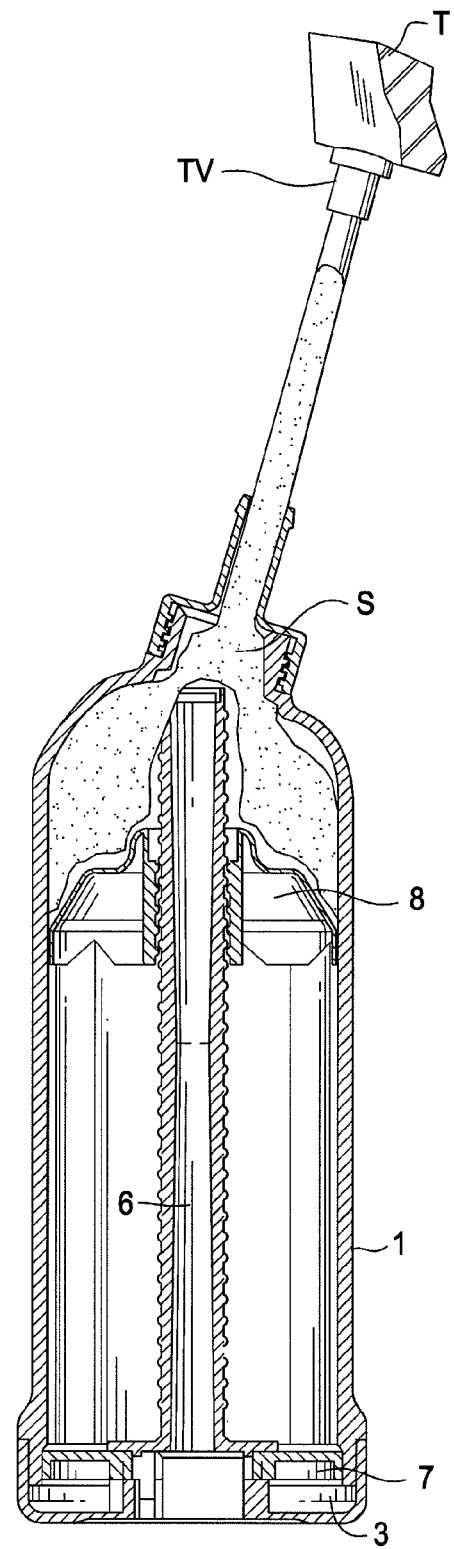
FIG. 6 is a cut-away view of the container in use on a tire.

FIG. 6 is a cut-away view of the container in use on a tire. Piston 8 is shown advanced to nearly the full length of the threaded shaft 6. Sealant (S) is shown discharging through cap 2 and tube 4 through the tire valve (TV) into the tire (T). As the tire is rotated the sealant flows through the tire to the puncture, where it then seals the puncture.

Figure 7:
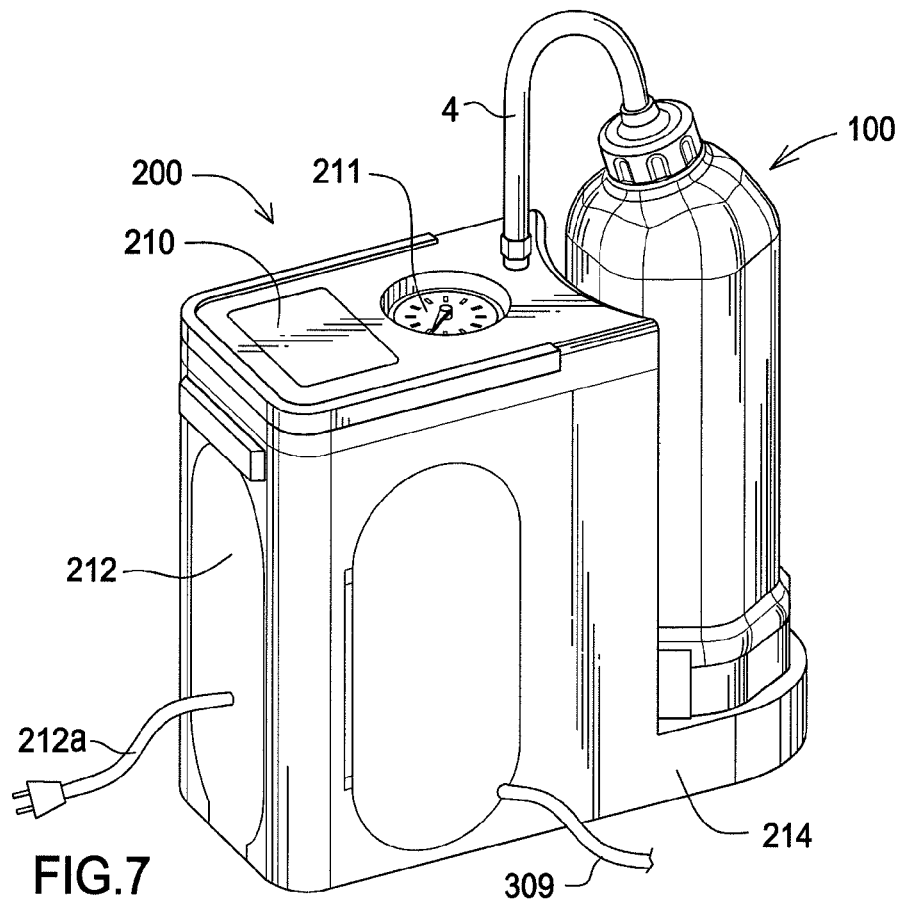
FIG. 7 is a perspective view of the tire filling system.

FIG. 7 is a perspective view of the tire filling system. The system comprises the container 100 and dispenser 200. The dispenser is electric in order to facilitate discharge of the sealant into a receiving tire. Dispenser 200 comprises an LAD screen for displaying various system variables and parameters. LAD displays for system parameters are widely known and available to one skilled in the art.

A pressure gage 211 displays a tire pressure when the dispenser is connected to a tire. Pressure gage 211 may be analogs or digital.

Compartment 212 contains a power cord 212a which may be connected to a vehicle electrical system or other power source. Vehicle electrical systems are typically 12 volt, but this is not disclosed in order to limit the breadth of use of the device.

Compartment 213 contains the hose 309 used to connect the dispenser to a tire. Dispenser body 214 may be made of plastic, metal or suitable durable material known in the art.

Figure 8:
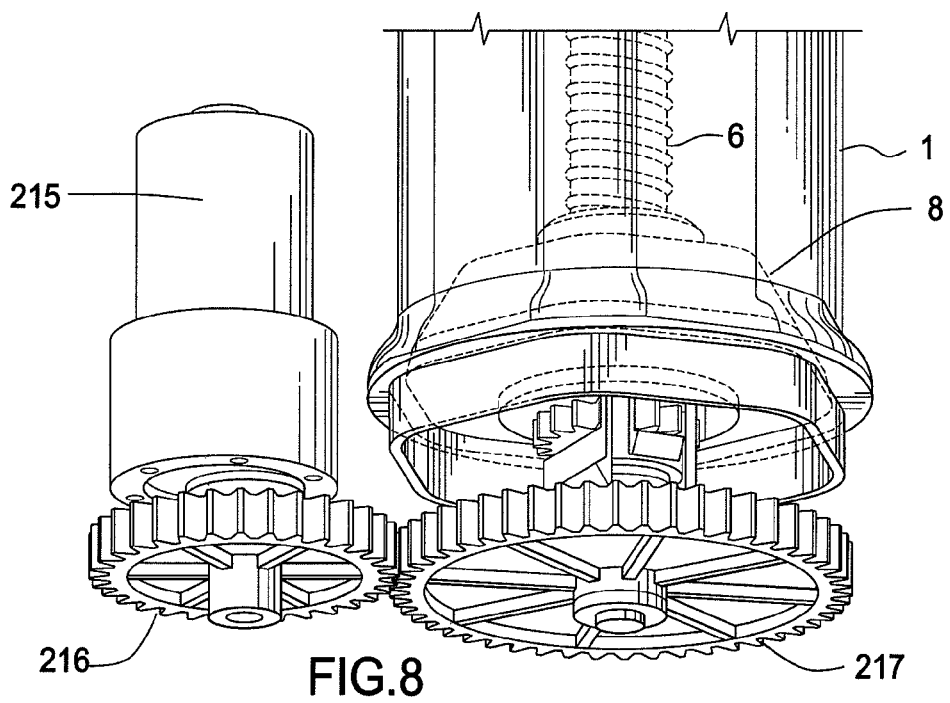
FIG. 8 is a detail view of the piston actuator.

FIG. 8 is a detail view of the piston actuator. A volt electric motor 215, and reduction gears 216, 217 are mounted within the body 214. Gear 217 engages a cooperating end 61 of threaded shaft 6. Gear 216 is attached to a motor shaft. As motor 215 operates the reduction gears to slow the rotational speed of gear 217 to approximately 4 RPM. This allows sealant (S) to be discharged into a tire in a controlled manner. The container will typically hold 16 Oz of sealant.

Figure 9:
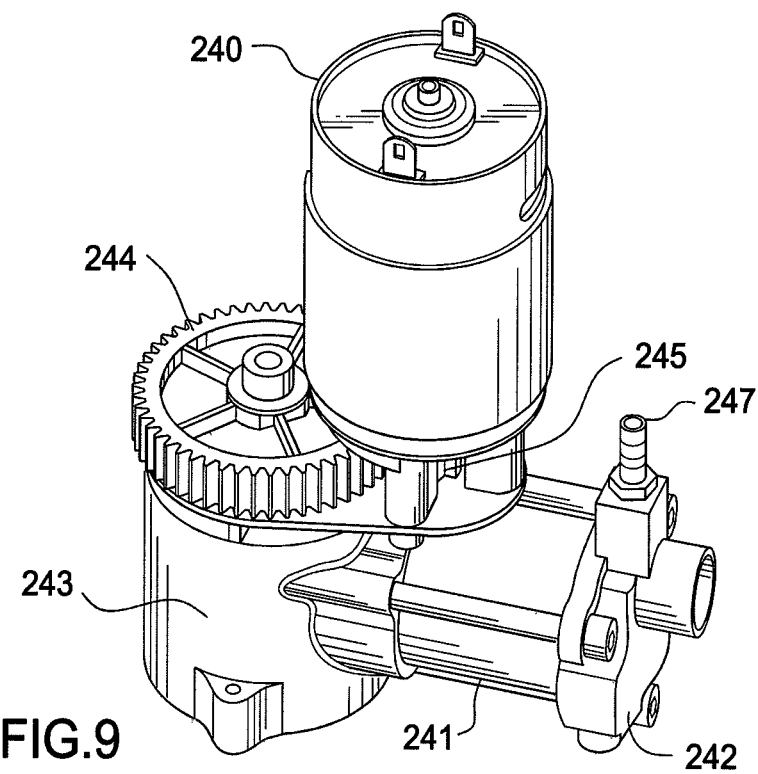
FIG. 9 is a detail of the air compressor.

FIG. 9 is a detail of the air compressor. A 12 volt electric motor 240, and reduction gears 244, 245 are mounted within the body 214. Gear 244 engages a cooperating end of the compressor 243. Gear 245 is attached to a motor shaft. The compressor comprises a cylinder 241 and a cylinder head 242. Outlet nipple 247 allows connection of the compressor to an outlet pipe 246.

Figure 10:
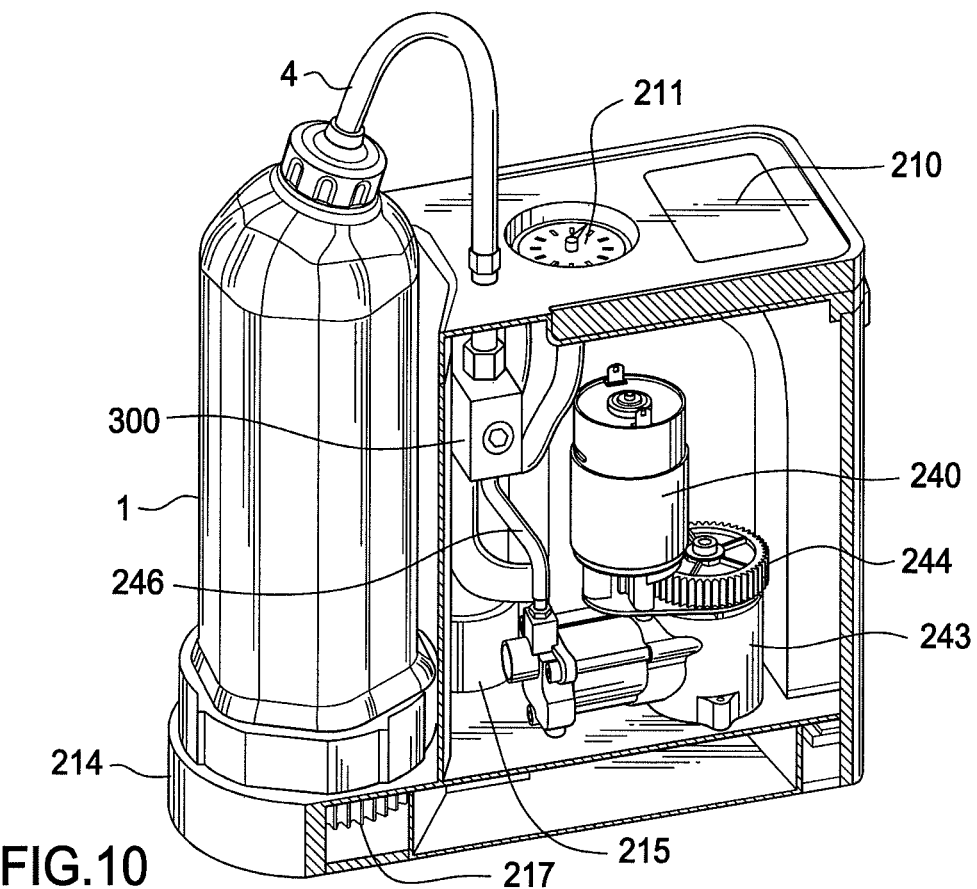
FIG. 10 is a cut-away view of the tire filling system.

FIG. 10 is a cut-away view of the tire filling system. The piston actuator (FIG. 8), compressor (FIG. 9) and one-way valve 300 are contained within body 214. Flexible tube 4 is connected to the one-way valve 300.

Figure 11:
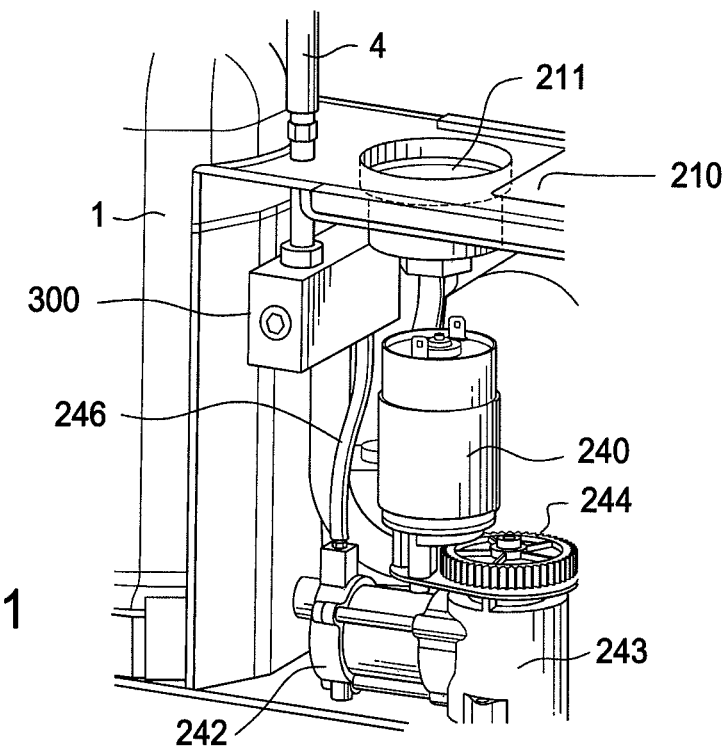
FIG. 11 is a cut-away view of the tire filling system.

FIG. 11 is a cut-away view of the tire filling system. Tube 4 and outlet pipe 246 are each connected to the one-way valve 300. Tube 4 conveys the sealant (S) and outlet pipe 246 conveys compressed air.

Figure 12:
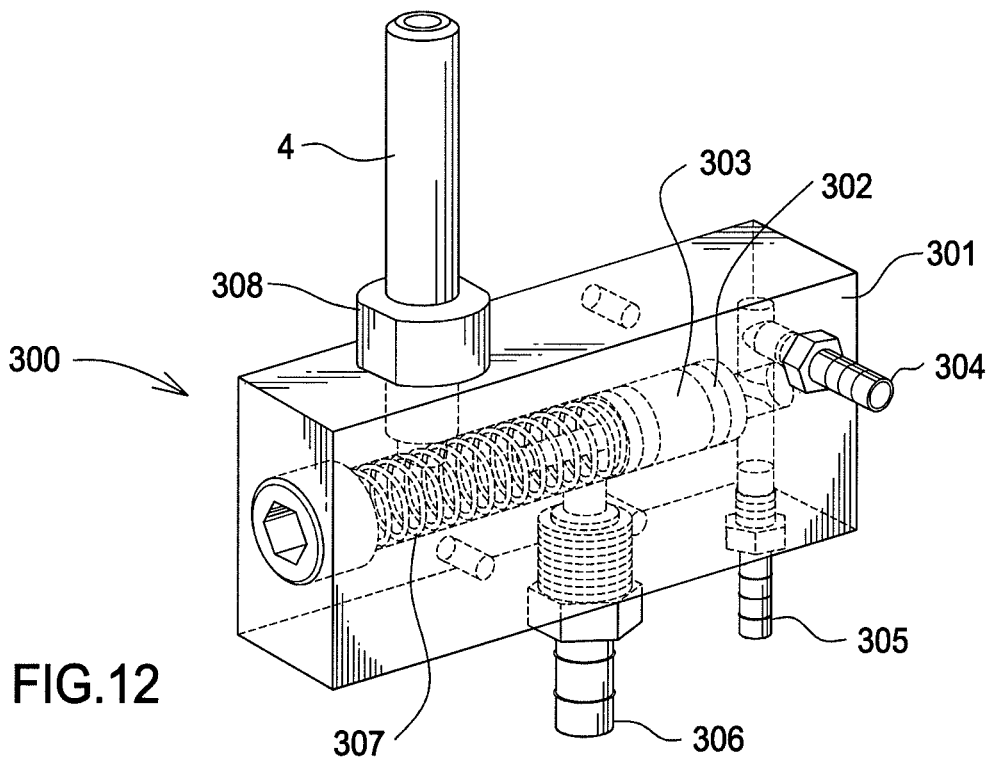
FIG. 12 is a cut-away view of the one-way valve.

FIG. 12 is a cut-away view of the one-way valve. One-way valve 300 comprises body 301, a piston 302 and o-ring 303. Piston 302 is slidingly contained within a cylindrical portion of body 301. O-rings 303 act to seal the piston within body 301. Spring 307 urges piston 302 into a first position which allows sealant to flow through the one-way valve to a common outlet 306 and thereby to a receiving tire. Compressor outlet pipe 246 attaches to nipple 305. The pressure gage 211 attaches to nipple 304.

Figure 13:
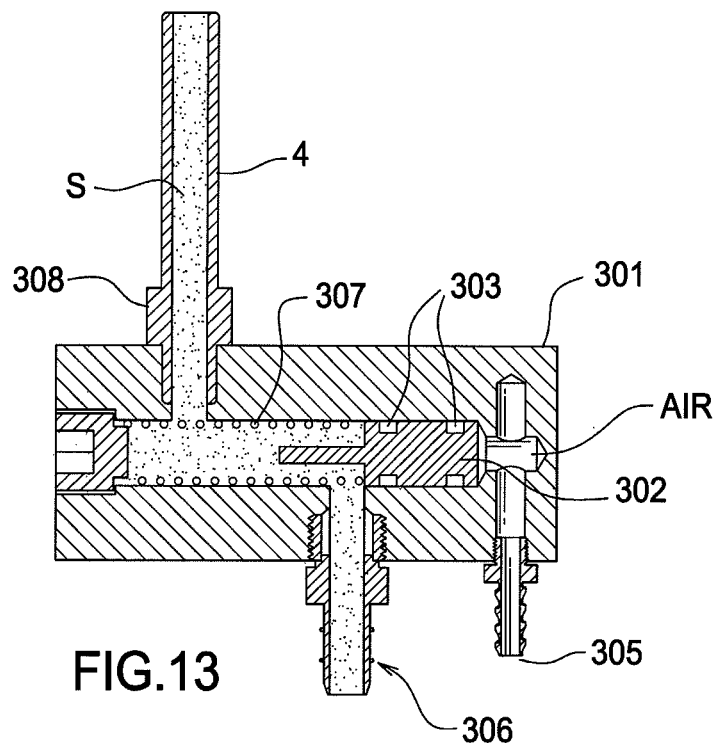
FIG. 13 is a cross-sectional view of the one-way valve in a first operating mode.

FIG. 13 is a cross-sectional view of the one-way valve in a first operating mode. In the first operating mode a spring 307 force causes piston 302 to close the air input from the compressor and thereby allow sealant (S) to flow through the one-way valve to the outlet nipple 306. Outlet nipple is connected to a hose 309 which is in turn connected to a receiving tire (T).

Tube 4 is connected to the one-way valve through nipple 308. In this first operating mode the air compressor is not in operation and only sealant is delivered to a tire. The actuator as described in FIG. 8 is in operation in this first mode.

Figure 14:
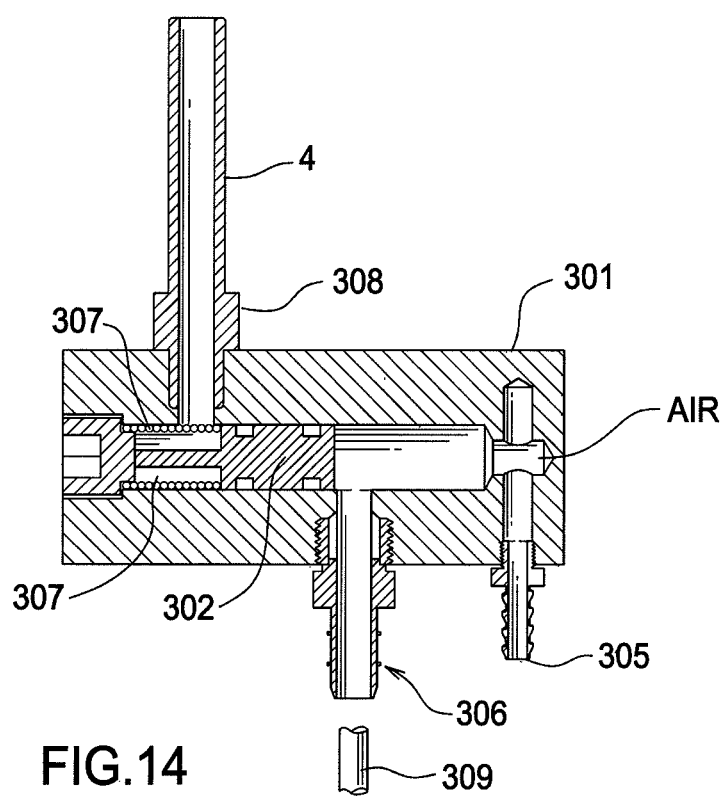
FIG. 14 is a cross-sectional view of the one-way valve in a second operating mode.

FIG. 14 is a cross-sectional view of the one-way valve in a second operating mode. In the second operating mode the air compressor is in operation which provides compressed air to the nipple 305, thereby overcoming the spring force which moves the piston 302 into a position to close the sealant tube 4 and stop the sealant flow. Compressed air can then be delivered to a tire. The actuator as described in FIG. 8 is not in operation in this second operating mode.

Figure 15:
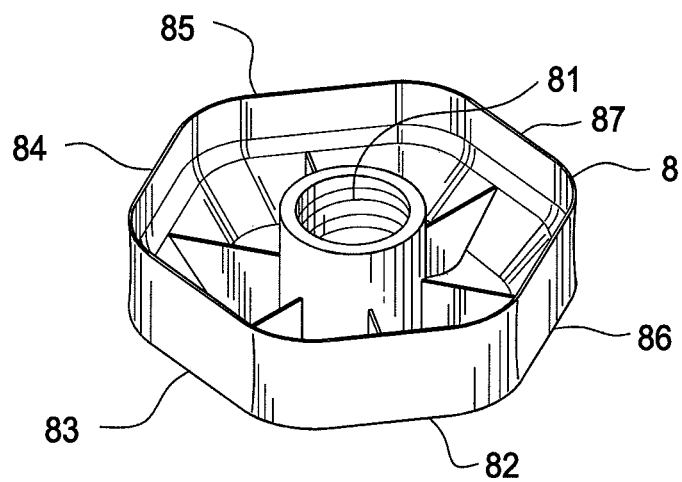
FIG. 15 is a perspective view of the piston.

FIG. 15 is a perspective view of the piston. Piston comprises six sides 82, 83, 84, 85, 86, 87 thereby forming a hexagonal planiform. Piston 8 slidingly engages an inner surface of body 1 and also seals against the inner surface of the body in order to allow the sealant to be forced from the body 1 during operation. The hexagonal form of piston 8 prevents piston 8 form rotating during operating as it is advancing along the length of container 1.

Figure 16:
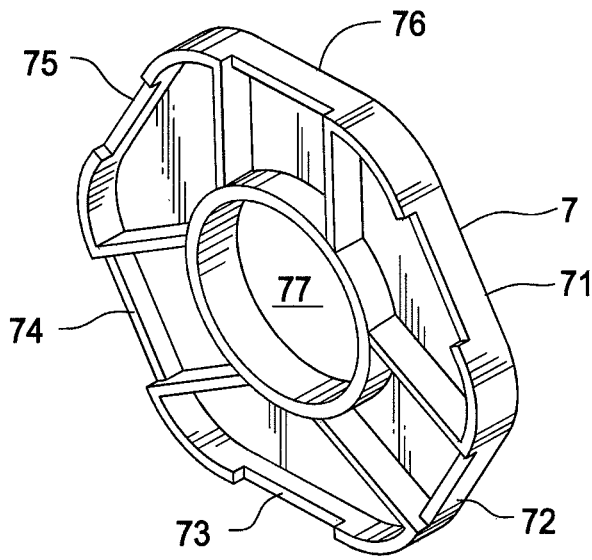
FIG. 16 is a perspective view of the bearing.

FIG. 16 is a perspective view of the bearing. Bearing 7 comprises six sides 71, 72, 73, 74, 75, 76, thereby forming a hexagonal planiform. Threaded shaft 6 extends through and engages hole 77.

Figure 17:
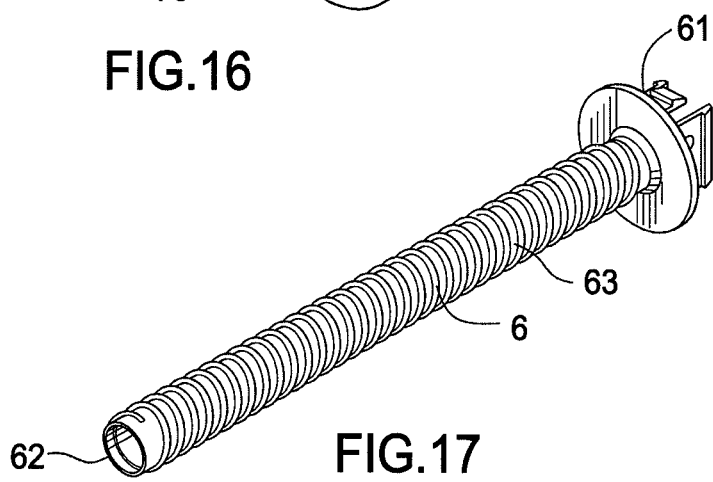
FIG. 17 is a perspective view of the threaded shaft.

FIG. 17 is a perspective view of the threaded shaft. Shaft 6 comprises threads 63 on an outer surface. Rotor 7 and gear 217 are each separately engage able with end 61 of threaded shaft 6.

Figure 18:
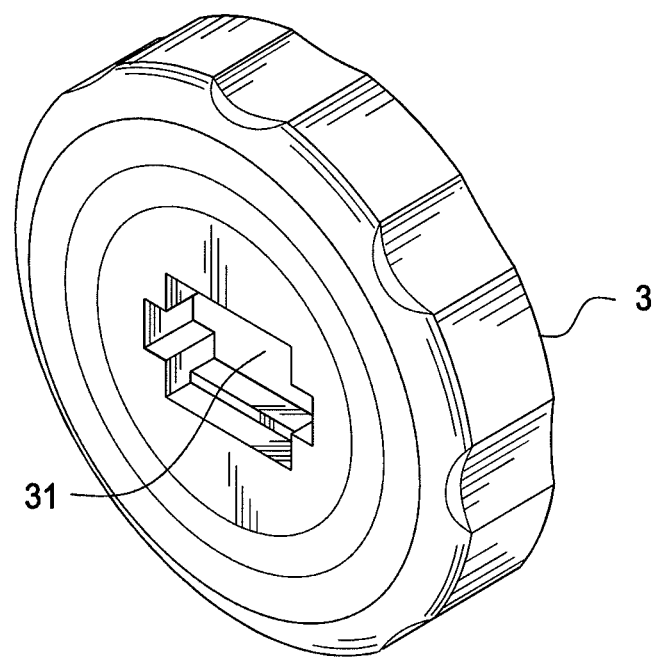
FIG. 18 is a perspective view of the rotor.

FIG. 18 is a perspective view of the rotor. Receiving portion 31 engages an end 61 of threaded shaft 6 whereby a torque can be applied to shaft 6 by rotation of rotor 3 or gear 217.

Figure 19:
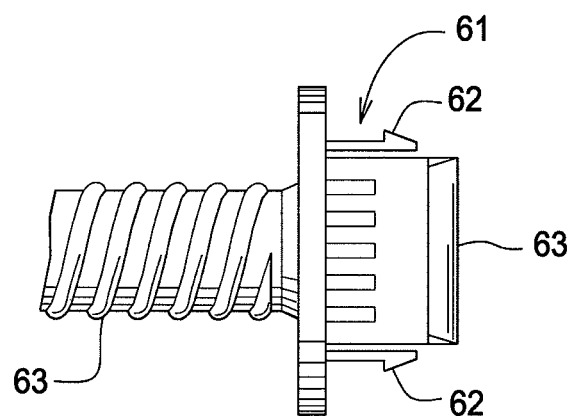
FIG. 19 is a detail side view of an end of the threaded shaft.

FIG. 19 is a detail side view of an end of the threaded shaft. Members 62 and 63 project into a mechanical engagement with receiving portion 31. Members 62 and 63 may comprise a "click" or "snap" type engagement or any other suitable mechanical engagement means known in the art.

Although a form of the invention has been described herein, it will be obvious to those skilled in the art that variations may be made in the construction and relation of parts without departing from the spirit and scope of the invention described herein.

I claim:
1. A tire sealant delivery system comprising:
a container;

a moveable piston disposed within the container, the moveable piston cooperatively engageable with the container such that the piston does not rotate during operation;
a threaded shaft cooperatively engaged with the piston and the container;
a tube for connecting the container to a receiver;
a dispenser comprising:
  an electric actuator, the electric actuator connectable to the container for rotating the threaded shaft;
  an air compressor; and
  a valve connectable to the container and connected to the air compressor, the valve operable to selectively allow dispensing of a tire sealant from the container to a receiving tire, or dispensing of compressed air from the air compressor to a receiving tire.

2. The tire sealant delivery system as in claim 1, wherein the container comprises a valve core tool.

3. The tire sealant delivery system as in claim 1, wherein the dispenser comprises a pressure gage.

4. The tire sealant delivery system as in claim 1, wherein the electric actuator is connectable to a vehicle electrical system.

5. The tire sealant delivery system as in claim 1, wherein the piston comprises a hexagonal planiform.

6. A pressurized gas inflation and tire sealant dispensing device comprising:
  a mounting assembly;
  a gas compressor supported on the mounting assembly for providing pressurized gas;
  a valve assembly supported on the mounting assembly, said valve assembly including a pressurized gas inlet, a sealant inlet, an outlet connectable to each inlet for discharge of sealant or pressurized gas, and a valve member for at least partially closing a flow of pressurized gas and a flow of sealant between the respective pressurized gas inlet or sealant inlet and the outlet;
  a pressurized gas conduit from the gas compressor to the pressurized gas inlet valve assembly;
  a conduit from the valve outlet;
  a sealant container for sealant, said container including a sealing outlet, a sealant conduit from the outlet, the sealant outlet connected to the valve assembly sealant inlet, an internal mechanically actuable piston in the container moveable between a sealant filled position and a sealant discharging position in response to mechanical actuation of the piston; and
  a mechanical drive assembly on the mounting assembly for mechanically driving the piston in the container intermediate the filled and discharged positions, said drive assembly including a drive rod mechanically engaging said piston.

7. The pressurized gas inflation and tire sealant dispensing device of claim 6 wherein said piston is actuable within said container between said sealant fill position and sealant discharging position independent of said gas compressor supported on said mounting assembly for providing pressurized gas.

* * * * *